United States Patent
Zhang et al.

(10) Patent No.: US 10,215,044 B2
(45) Date of Patent: Feb. 26, 2019

(54) INTERSTAGE SEAL HOUSING OPTIMIZATION SYSTEM IN A GAS TURBINE ENGINE

(71) Applicant: Siemens Energy, Inc., Orlando, FL (US)

(72) Inventors: Jiping Zhang, Winter Springs, FL (US); Patrick M. Pilapil, Kissimmee, FL (US); Yan Yin, Oviedo, FL (US); Joshua D. Kovac, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 270 days.

(21) Appl. No.: 15/325,527

(22) PCT Filed: Aug. 8, 2014

(86) PCT No.: PCT/US2014/050255
§ 371 (c)(1),
(2) Date: Jan. 11, 2017

(87) PCT Pub. No.: WO2016/022136
PCT Pub. Date: Feb. 11, 2016

(65) Prior Publication Data
US 2017/0145847 A1    May 25, 2017

(51) Int. Cl.
*F01D 11/00* (2006.01)
*F01D 11/02* (2006.01)
(Continued)

(52) U.S. Cl.
CPC ............ *F01D 11/003* (2013.01); *F01D 11/02* (2013.01); *F01D 11/025* (2013.01); *F01D 25/26* (2013.01);
(Continued)

(58) Field of Classification Search
CPC ...... F01D 11/003; F01D 11/02; F01D 11/025; F01D 25/26; F01D 11/08; F01D 11/10;
(Continued)

(56) References Cited

U.S. PATENT DOCUMENTS 3,936,234 A    2/1976   Tucker et al.
4,208,170 A    6/1980   Tucker et al.
(Continued)

FOREIGN PATENT DOCUMENTS

CN       1839274 A    9/2006
CN     101135378 A    3/2008
(Continued)

OTHER PUBLICATIONS

PCT International Search Report and Written Opinion dated Apr. 7, 2015 corresponding to PCT Application PCT/US2014/050255 filed Aug. 8, 2014. (10 pages).

*Primary Examiner* — Patrick Hamo
*Assistant Examiner* — Joseph S. Herrmann (57) ABSTRACT

An interstage seal system (10) for adjusting the position of an interstage seal during operation of a gas turbine engine (14) to increase efficiency of the seal (12) is disclosed. The interstage seal system (10) may include a interstage seal housing (16) formed from a circumferentially extending housing having a seal (12) positioned on a radially inward surface (18) of the interstage seal housing (16). The interstage seal housing (16) may biased radially outward via one or more springs (20) to bias the radially inward surface (18) of the interstage seal housing (16) outwardly. The interstage seal housing (16) may reside in an interstage housing receiving cavity (68). The cavity (68) may be supplied with gases at a higher pressure than on the other side (24) of the seal housing (16) during turbine engine operation. As such, the interstage seal housing (16) is forced radially inwardly to close the gap (26) within the seal (12) as the high pressure
(Continued)

force directed radially inward overcomes the spring bias directed radially outward.

16 Claims, 6 Drawing Sheets

(51) Int. Cl.
  *F16J 15/44* (2006.01)
  *F01D 25/26* (2006.01)
(52) U.S. Cl.
  CPC ......... *F16J 15/445* (2013.01); *F05D 2220/32* (2013.01); *F05D 2240/70* (2013.01); *F05D 2260/52* (2013.01)
(58) Field of Classification Search
  CPC .............. F05D 2220/32; F05D 2240/70; F05D 2260/52; F16J 15/445; F16J 15/447
  See application file for complete search history.

(56) References Cited

U.S. PATENT DOCUMENTS

| | | | | |
|---|---|---|---|---|
| 4,487,016 A | * | 12/1984 | Schwarz | F01D 5/082 |
| | | | | 415/116 |
| 4,621,976 A | | 11/1986 | Marshall et al. | |
| 5,236,309 A | | 8/1993 | Van Heusden et al. | |
| 5,259,728 A | | 11/1993 | Szpunar et al. | |
| 5,501,573 A | * | 3/1996 | Sanders | F01D 5/225 |
| | | | | 277/303 |
| 5,601,402 A | | 2/1997 | Wakeman et al. | |
| 5,603,510 A | * | 2/1997 | Sanders | F01D 11/025 |
| | | | | 277/413 |
| 6,139,018 A | * | 10/2000 | Cromer | F16J 15/3288 |
| | | | | 277/301 |
| 6,655,696 B1 | * | 12/2003 | Fang | F16J 15/445 |
| | | | | 277/409 |
| 6,786,487 B2 | * | 9/2004 | Dinc | F01D 11/025 |
| | | | | 277/355 |
| 7,066,470 B2 | * | 6/2006 | Turnquist | F01D 11/025 |
| | | | | 277/355 |
| 7,291,946 B2 | | 11/2007 | Clouse et al. | |
| 7,344,357 B2 | * | 3/2008 | Couture, Jr. | F01D 11/001 |
| | | | | 277/413 |
| 7,434,402 B2 | | 10/2008 | Paprotna et al. | |
| 7,494,317 B2 | * | 2/2009 | Keller | F01D 11/025 |
| | | | | 415/135 |
| 7,596,954 B2 | | 10/2009 | Penda et al. | |
| 7,686,569 B2 | | 3/2010 | Paprotna et al. | |
| 8,181,967 B2 | * | 5/2012 | Feeny | F01D 11/025 |
| | | | | 277/412 |
| 10,054,232 B2 | * | 8/2018 | Seaton | F16J 15/443 |
| 2003/0102630 A1 | | 6/2003 | Dinc et al. | |
| 2004/0012149 A1 | * | 1/2004 | Laurello | F01D 11/00 |
| | | | | 277/355 |
| 2009/0022594 A1 | | 1/2009 | Garner et al. | |
| 2010/0278645 A1 | * | 11/2010 | Narita | F01D 1/02 |
| | | | | 415/230 |
| 2013/0101391 A1 | | 4/2013 | Szwedowicz et al. | |
| 2014/0109590 A1 | | 4/2014 | Casavant et al. | |

FOREIGN PATENT DOCUMENTS

| | | |
|---|---|---|
| CN | 102132047 A | 7/2011 |
| GB | 2468768 A | 9/2010 |
| JP | S61152906 A | 7/1986 |
| WO | 0157420 A1 | 8/2001 |
| WO | 2011078962 A1 | 6/2011 |

* cited by examiner

INTERSTAGE SEAL HOUSING OPTIMIZATION SYSTEM IN A GAS TURBINE ENGINE

FIELD OF THE INVENTION

This invention is directed generally to turbine engines, and more particularly to sealing systems for reducing gaps between rotating components and radially adjacent, stationary components in turbine engines so as to improve turbine engine efficiency by reducing leakage past the sealing systems.

BACKGROUND

In gas turbine engines, a need often exists to seal connections between adjacent turbine components in order to separate fluids and to maintain a turbine's efficiency. More particularly, a seal is often needed to separate high pressure regions from low pressure regions between components whereby one of the components is stationary and an adjacent component rotates. For instance, a common location for separating high pressure compressor gases and low pressure gases is between a rotor assembly, which rotates, and a stator assembly, which remains relatively stationary during operation of a turbine engine.

A conventional seal used between rotatable and stationary components of a turbine engine comprised of a labyrinth seal having a plurality of ridges extending from a rotatable body. The ridges are sized to initially contact the opposing stationary body and to cut grooves into the stationary body. As the rotatable body rotates during use, the ridges simply rotate within the grooves. The ridges prevent some gases, but not all gases, from passing between the gap created between the ridges and the grooves. Thus, the labyrinth seal is susceptible to leakage and results in inefficiencies in the turbine engine in which the seal is used. Thus, a need exists for a turbine seal capable of sealing openings between rotatable and stationary turbine components.

SUMMARY OF THE INVENTION

An interstage seal system for adjusting the position of an interstage seal during operation of a gas turbine engine to increase efficiency of the seal is disclosed. The interstage seal system may include a interstage seal housing formed from a circumferentially extending housing having a seal positioned on a radially inward surface of the interstage seal housing. The interstage seal housing may biased radially outward via one or more springs to bias the radially inward surface of the interstage seal housing outwardly. The interstage seal housing may reside in an interstage housing receiving cavity. The cavity may be supplied with gases at a higher pressure than on the other side of the interstage seal housing during turbine engine operation. As such, the interstage seal housing is forced radially inwardly to close the gap within the seal as the high pressure force directed radially inward overcomes the spring bias directed radially outward.

In at least one embodiment, the system for radially positioning an interstage seal housing within a gas turbine engine may include an interstage seal housing formed from a circumferentially extending housing having a seal positioned on a radially inward surface of the interstage seal housing and one or more biasing supports extending radially outward from the interstage seal housing. The system may also include one or more springs coupled to the biasing support to bias the radially inward surface of the interstage seal housing and one or more side wave springs extending between an outer surface of the interstage seal housing into contact with an adjacent component of the gas turbine engine.

The interstage seal housing may have an axially extending upstream support arm with a radially inward sealing surface and may form an upstream cavity for receiving a first hook of the interstage seal housing support. The interstage seal housing may also have an axially extending downstream support arm with a radially inward sealing surface and may form an downstream cavity for receiving a second hook of the interstage seal housing support. The axially extending upstream support arm and the axially extending downstream support arm may be positioned radially outward of the radially inward surface of the interstage seal housing. The interstage seal housing support may be positioned radially outward from the interstage seal housing and may include a first arm with a first hook on an upstream side of the interstage seal housing. The first hook may be received within the upstream cavity and may include a radially outward sealing surface configured to seal with the radially inward sealing surface of the axially extending upstream support arm during turbine operation. The interstage seal housing support may also include a second arm with a second hook on an downstream side of the interstage seal housing. The second hook may be received within the downstream cavity and may include a radially outward sealing surface configured to seal with the radially inward sealing surface of the axially extending downstream support arm during turbine operation.

The interstage seal housing support may also include one or more inlet channels in communication with an interstage housing receiving cavity for supplying pressurized gases to the interstage housing receiving cavity at a higher pressure than on a side of the interstage seal housing at the seal positioned on the radially inward surface of the interstage seal housing. The interstage seal housing support may include one or more outlet channels in communication with the interstage housing receiving cavity for exhausting pressurized gases at a higher pressure than on the side of the interstage seal housing at the seal positioned on the radially inward surface of the interstage seal housing.

The spring biasing support may include one or more shafts having one or more heads at a distal end, whereby the head supports a distal end of the spring. The shaft may be hollow and form a bolt receiving cavity. A bolt may extend through the bolt receiving cavity such that a proximal end of the bolt is coupled to the interstage seal housing and a distal end of the bolt includes a head that bears against an outer surface of the shaft. A proximal end of the spring may bears against an interstage seal housing support positioned radially outward from the interstage seal housing. The biasing support may be centered within an outer surface of the interstage seal housing.

In at least one embodiment, the seal positioned on the radially inward surface of the interstage seal housing may be formed from a circumferentially extending housing having a plurality of seal arms extending radially inward forming a labyrinth seal on a radially inward surface of the interstage seal housing. The plurality of seal arms positioned on the radially inward surface of the interstage seal housing may be seal arms that are generally parallel with each other. The spring may be positioned concentrically around the at least one biasing support, wherein the spring is configured to bias the inward surface of the interstage seal housing radially outward.

In at least one embodiment, the side wave spring may be formed from a plurality of side wave springs. The side wave springs may contact the outer surface of the interstage seal housing and an adjacent component multiple times with a W shaped configuration. The W shaped configuration of the side wave spring may have a plurality of ridges and valleys coupled together in an alternating pattern along a longitudinal axis. The plurality of side wave springs may extend circumferentially and are offset circumferentially from each other.

During operation, the interstage seal housing resides within the interstage housing receiving cavity in the interstage seal housing support. The interstage seal housing is held in place with the first hook extending from the interstage seal housing support into the upstream cavity in the interstage seal housing and with the second hook extending from the interstage seal housing support into the downstream cavity in the interstage seal housing. The spring also biases the interstage seal housing in a radially outward direction by pushing the head of the biasing support radially outward. As the turbine engine operates, gases having a higher pressure than gases radially inward of the radially inward surface are deposited into the interstage housing receiving cavity via the inlet channel. The higher pressure gases create a force within the interstage housing receiving cavity that overcomes the biasing force of the spring and drives the interstage seal housing radially inward until the radially outward sealing surface of the first hook contacts the radially inward sealing surface of the axially extending upstream support arm and the radially outward sealing surface of the second hook contacts the radially inward sealing surface of the axially extending downstream support arm.

An advantage of the interstage seal system is that positioning the interstage seal housing in this manner enables the seal to be positioned in an efficient position to provide the designed sealing characteristics yet not fail prematurely.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-6, an interstage seal system 10 for adjusting the position of an interstage seal 12 during operation of a gas turbine engine 14 to increase efficiency of the seal 12 is disclosed. The interstage seal system 10 may include a interstage seal housing 16 formed from a circumferentially extending housing having a seal 12 positioned on a radially inward surface 18 of the interstage seal housing 16. The interstage seal housing 16 may biased radially outward via one or more springs 20 to bias the radially inward surface 18 of the interstage seal housing 16 outwardly. The interstage seal housing 16 may reside in an interstage housing receiving cavity 22. The cavity 22 may be supplied with gases at a higher pressure than on the other side 24 of the interstage seal housing 16 during turbine engine operation. As such, the interstage seal housing 16 is forced radially inwardly to close the gap 26 within the seal 12 as the high pressure force directed radially inward overcomes the spring bias directed radially outward.

In at least one embodiment, the interstage seal system 10 may be configured for radially positioning an interstage seal housing 16 within a gas turbine engine 14. The interstage seal housing 16 may be formed from a circumferentially extending housing having a seal 12 positioned on a radially inward surface of the interstage seal housing 16. The interstage seal system 10 may include one or more biasing supports 28 extending radially outward from the interstage seal housing 16. The interstage seal system 10 may include one or more springs 20 coupled to the biasing support 28 to bias the radially inward surface 18 of the interstage seal housing 16. The interstage seal system 10 may include one or more side wave springs 30 extending between an outer surface 32 of the interstage seal housing 16 into contact with an adjacent component of the gas turbine engine 14, which may be the interstage seal housing support 42.

The interstage seal housing 16 may have an axially extending upstream support arm 34 with a radially inward sealing surface 36 and forming an upstream cavity 38 for receiving a first hook 40 of an interstage seal housing support 42, and has an axially extending downstream support arm 44 with a radially inward sealing surface 46 and forming an downstream cavity 48 for receiving a second hook 50 of the interstage seal housing support 42. The axially extending upstream support arm 34 and the axially extending downstream support arm 44 may be positioned radially outward of the radially inward surface 18 of the interstage seal housing 16. The interstage seal housing support 42 may be positioned radially outward from the interstage seal housing 16 and including a first arm 52 with the first hook 40 on an upstream side 54 of the interstage seal housing 16. The first hook 40 may be received within the upstream cavity 38 and may include a radially outward sealing surface 56 configured to seal with the radially inward sealing surface 36 of the axially extending upstream support arm 34 during turbine operation. The interstage seal housing support 42 may also include a second arm 58 with a second hook 50 on an downstream side 62 of the interstage seal housing 16. The second hook 50 may be received within the downstream cavity 48 and may include a radially outward sealing surface 64 configured to seal with the radially inward sealing surface 46 of the axially extending downstream support arm 44 during turbine operation.

The interstage seal housing support 42 may also include one or more inlet channels 66 in communication with an interstage housing receiving cavity 22 for supplying pressurized gases to the interstage housing receiving cavity 22 at a higher pressure than on a side 24 of the interstage seal housing 16 at the seal 12 positioned on the radially inward surface 18 of the interstage seal housing 16. The inlet channel 66 may extend radially inward and terminate within an interstage housing receiving cavity 68 in which the interstage seal housing 16 resides. The inlet channel 66 may have any appropriate cross-sectional shape, area and size. The inlet channel 66 may be formed from a single channel or multiple channels. The interstage seal housing support 42 may also include one or more outlet channels 70 in communication with the interstage housing receiving cavity 68 for exhausting pressurized gases at a higher pressure than on the side 24 of the interstage seal housing 16 at the seal 12 positioned on the radially inward surface 18 of the interstage seal housing 16. The outlet channel 70 may extend axially and have an inlet 72 in communication with the interstage housing receiving cavity 68. The outlet channel 70 may have any appropriate cross-sectional shape, area and size. The outlet channel 70 may be formed from a single channel or multiple channels.

Figure 1:
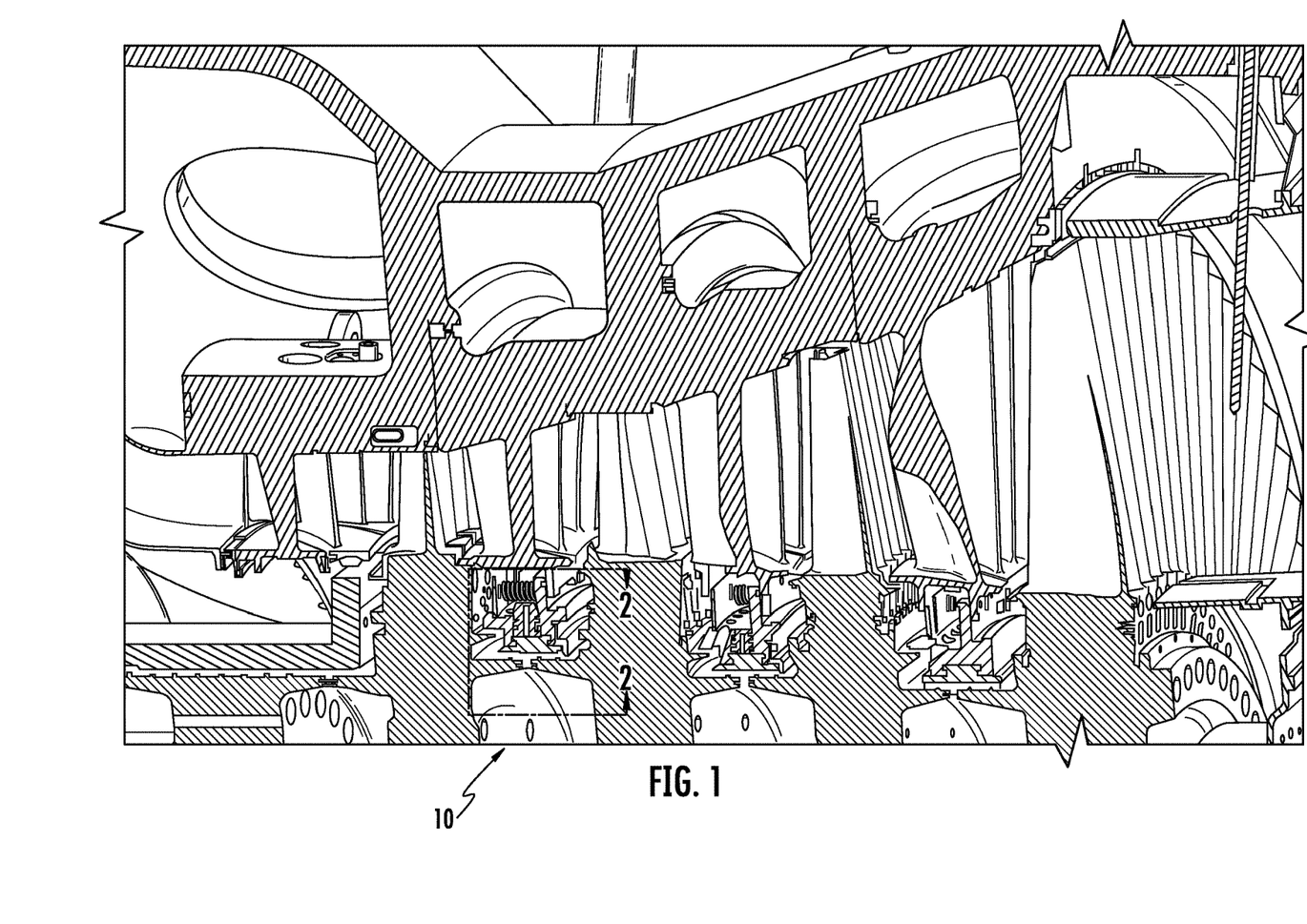
FIG. 1 is a cross-sectional side view of an aspect of a turbine engine showing the interstage seal system positioned radially inward of a vane and between adjacent stages of blades.
Figure 2:
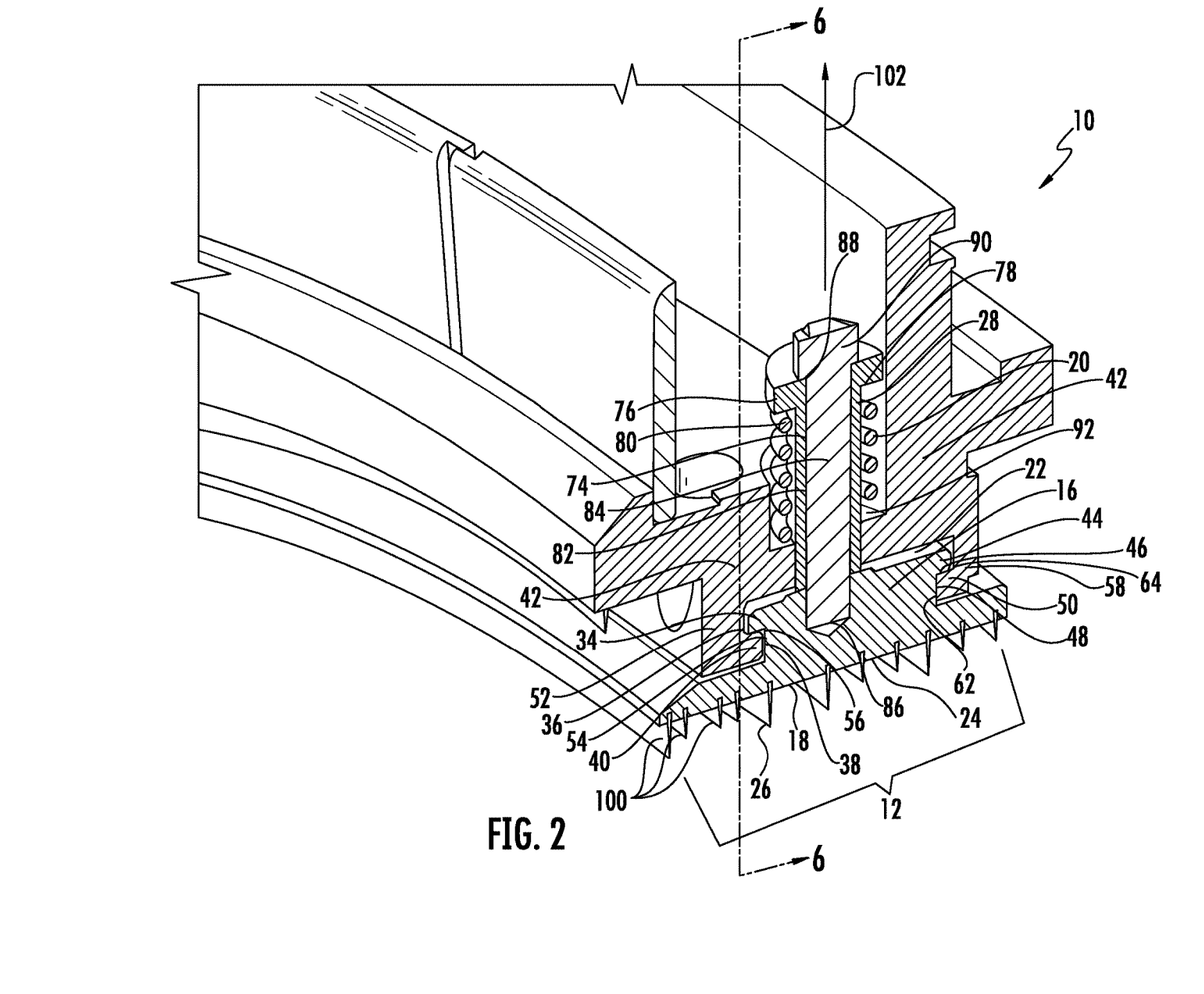
FIG. 2 is a cross-sectional perspective view of the interstage seal system together with an interstage seal housing support in place taken a detail line 2-2.
Figure 3:
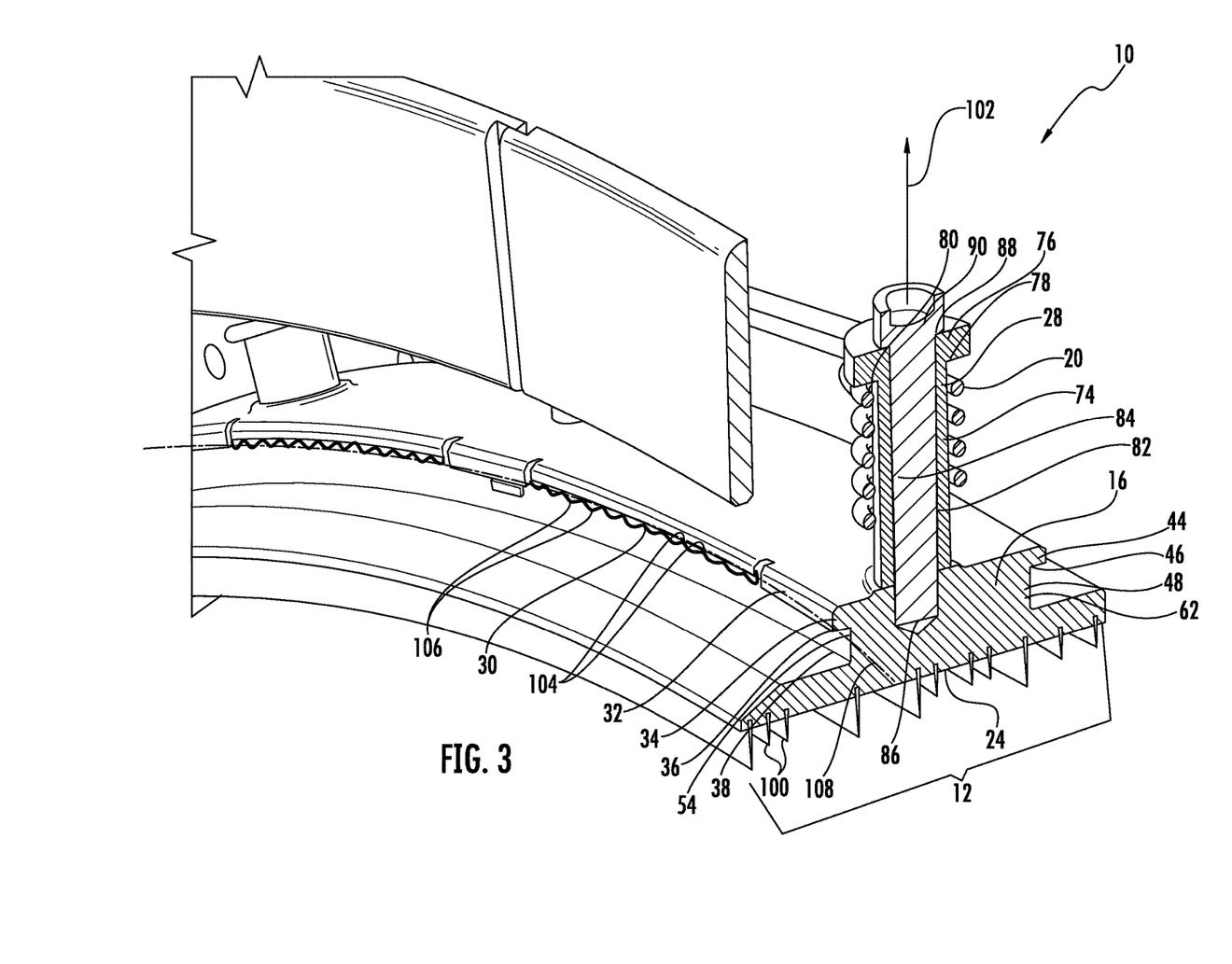
FIG. 3 is a cross-sectional perspective view of the interstage seal system together with the interstage seal housing support removed.
Figure 4:
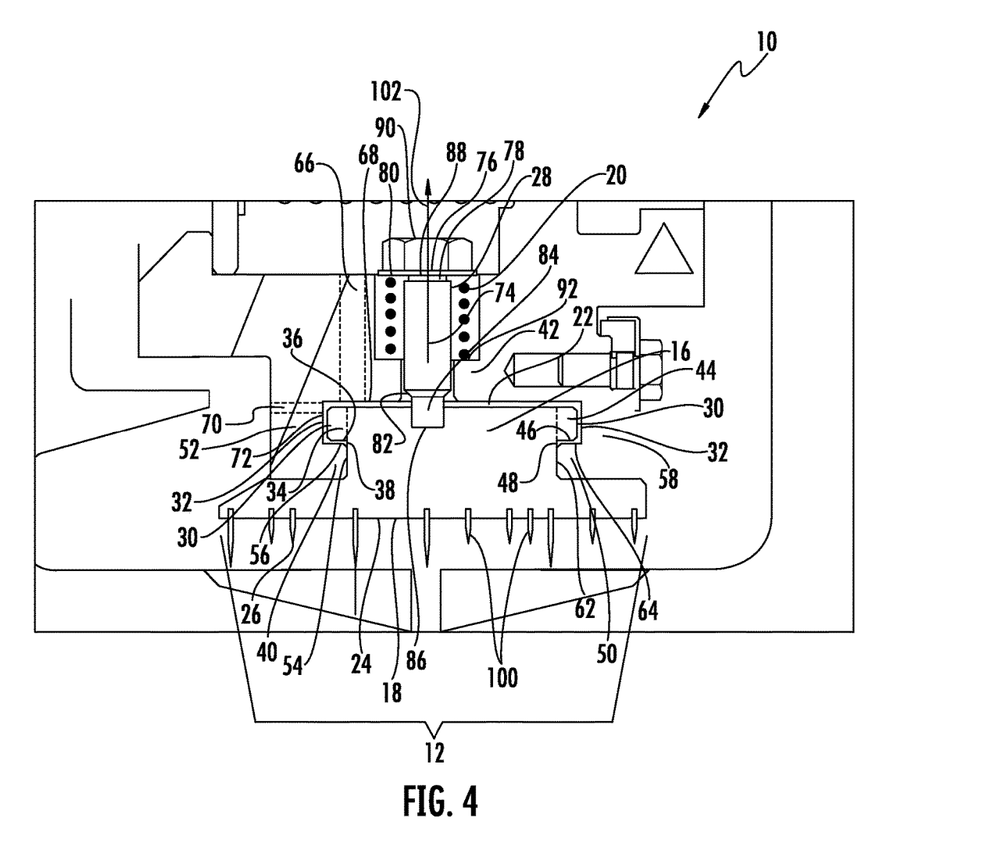
FIG. 4 is cross-sectional side view of the interstage seal system coupled to the interstage seal housing support.
Figure 5:
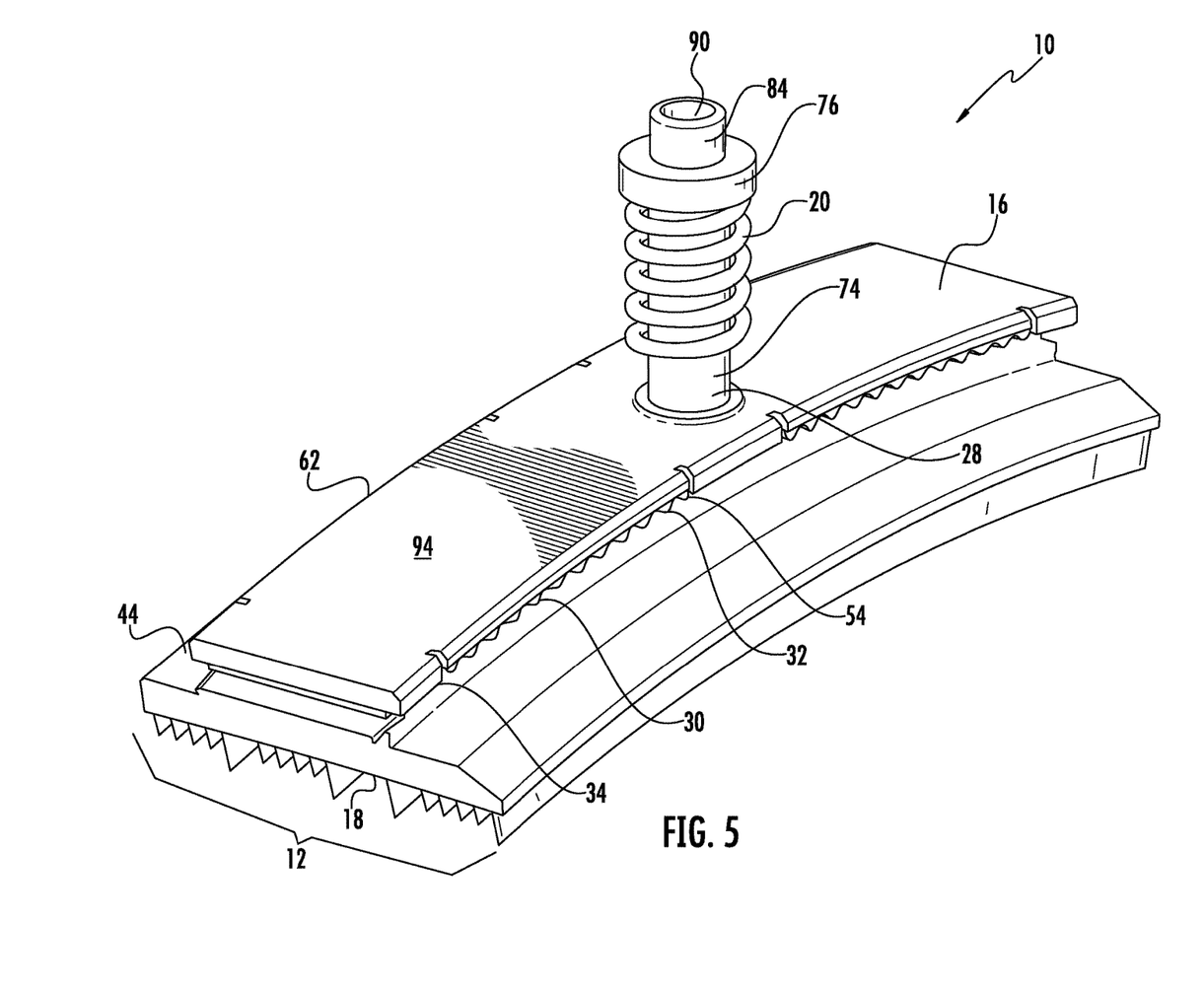
FIG. 5 is a perspective view of portions of the interstage seal system.
Figure 6:
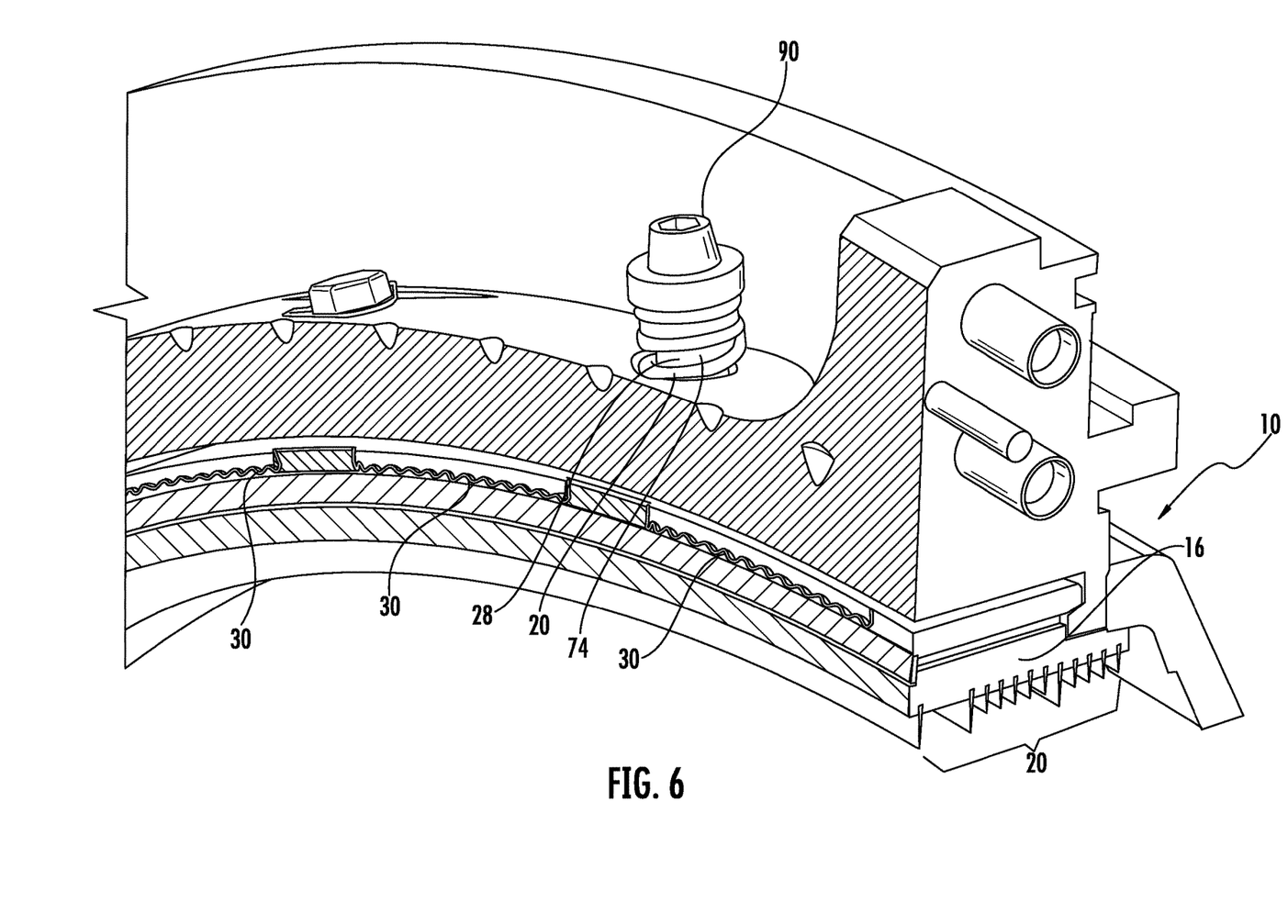
FIG. 6 is a cross-sectional perspective view of the interstage seal system together with the interstage seal housing support removed taken along section line 6-6 in FIG. 2.

The spring biasing support 28 may include one or more shafts 74 having one or more heads 76 at a distal end 78. The head 76 may support a distal end 80 of the spring 20. The shaft 74 may be hollow and may form a bolt receiving cavity 82. A bolt 84 may extend through the bolt receiving cavity 82 such that a proximal end 86 of the bolt 84 is coupled to the interstage seal housing 16 and a distal end 88 of the bolt 84 may include a head 90 that bears against an outer surface of the shaft 74. A proximal end 92 of the spring 20 may bear against an interstage seal housing support 42 positioned radially outward from the interstage seal housing 16. The biasing support 28 may be centered within an outer surface 94 of the interstage seal housing 16, as shown in FIG. 5.

The seal 12 positioned on the radially inward surface 18 of the interstage seal housing 16 may be formed from a circumferentially extending housing having a plurality of seal arms 100 extending radially inward forming a labyrinth seal on a radially inward surface 18 of the interstage seal housing 16. The plurality of seal arms 100 positioned on the radially inward surface 18 of the interstage seal housing 16 may be seal arms 100 that are generally parallel with each other. In at least one embodiment, the spring 20 may be positioned concentrically around the biasing support 28. The spring 20 may be configured to bias the inward surface 18 of the interstage seal 12 housing radially outward in direction 102.

In at least one embodiment, the side wave spring 30 comprises a plurality of side wave springs 30. The side wave springs 30 may contact the outer surface 32 of the interstage seal housing 16 and an adjacent component multiple times with a W shaped configuration. The W shaped configuration of the side wave spring 30 may have a plurality of ridges 104 and valleys 106 coupled together in an alternating pattern along a longitudinal axis 108. The plurality of side wave springs 30 may extend circumferentially and may be offset circumferentially from each other.

During operation, the interstage seal housing 16 resides within the interstage housing receiving cavity 22 in the interstage seal housing support 42. The interstage seal housing 16 is held in place with the first hook 40 extending from the interstage seal housing support 42 into the upstream cavity 38 in the interstage seal housing 16 and with the second hook 50 extending from the interstage seal housing support 42 into the downstream cavity 48 in the interstage seal housing 16. The spring 20 also biases the interstage seal housing 16 in a radially outward direction 102 by pushing the head 76 of the biasing support 28 radially outward. Typically, a pinch point between thermal expansion and tolerances of the interstage seal 12 is reached in an early stage of turbine engine operation.

As the turbine engine operates, gases having a higher pressure than gases radially inward of the radially inward surface 18 are deposited into the interstage housing receiving cavity 22 via the inlet channel 66. The higher pressure gases create a force within the interstage housing receiving cavity 22 that overcomes the biasing force of the spring 20 and drives the interstage seal housing 16 radially inward until the radially outward sealing surface 56 of the first hook 40 contacts the radially inward sealing surface 36 of the axially extending upstream support arm 34 and the radially outward sealing surface 64 of the second hook 50 contacts the radially inward sealing surface 46 of the axially extending downstream support arm 44. Positioning the interstage seal housing 16 in this manner enables the seal 12 to be positioned in an efficient position to provide the designed sealing characteristics yet not fail prematurely.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A system for a radial position of an interstage seal housing within a gas turbine engine, comprising:
    an interstage seal housing formed from a circumferentially extending housing having a seal positioned on a radially inward surface of the interstage seal housing;
    at least one biasing support extending radially outward from the interstage seal housing;
    at least one spring coupled to the at least one biasing support to bias the radially inward surface of the interstage seal housing; and
    at least one side wave spring extending between an outer surface of the interstage seal housing and an adjacent component of the gas turbine engine, the at least one wave spring being in contact with the adjacent component of the gas turbine engine;
    wherein the at least one spring is positioned concentrically around the at least one biasing support, wherein the at least one spring is configured to bias the radially inward surface of the interstage seal housing radially outward.

2. The system of claim 1, wherein the adjacent component of the gas turbine engine is an interstage seal housing support, the interstage seal housing has an axially extending upstream support arm with a radially inward sealing surface and forming an upstream cavity for receiving a first hook of the interstage seal housing support, and has an axially extending downstream support arm with a radially inward sealing surface and forming an downstream cavity for receiving a second hook of the interstage seal housing support.

3. The system of claim 2, wherein the interstage seal housing support is positioned radially outward from the interstage seal housing and includes a first arm with the first hook on an upstream side of the interstage seal housing, wherein the first hook is received within the upstream cavity and includes a radially outward sealing surface configured to seal with the radially inward sealing surface of the axially extending upstream support arm during turbine operation, and includes a second arm with the second hook on a downstream side of the interstage seal housing, wherein the second hook is received within the downstream cavity and includes a radially outward sealing surface configured to seal with the radially inward sealing surface of the axially extending downstream support arm during turbine operation.

4. The system of claim 3, wherein the interstage seal housing support further comprises at least one inlet channel in communication with an interstage housing receiving cavity for supplying pressurized gases to the interstage housing receiving cavity at a higher pressure than on a side of the interstage seal housing at the seal positioned on the radially inward surface of the interstage seal housing.

5. The system of claim 4, wherein the interstage seal housing support further comprises at least one outlet channel in communication with the interstage housing receiving cavity for exhausting the pressurized gases at a higher pressure than on the side of the interstage seal housing at the seal positioned on the radially inward surface of the interstage seal housing.

6. The system of claim 1, wherein the at least one biasing support comprises at least one shaft having at least one head at a distal end, wherein the head supports a distal end of the at least one spring.

7. The system of claim 6, wherein the at least one shaft is hollow and forms a bolt receiving cavity.

8. The system of claim 7, further wherein a bolt extending through the bolt receiving cavity such that a proximal end of the bolt is coupled to the interstage seal housing and a distal end of the bolt includes a head that bears against an outer surface of the shaft.

9. The system of claim 8, wherein the adjacent component of the gas turbine engine is an interstage housing support, a proximal end of the at least one spring bears against the interstage seal housing support which is positioned radially outward from the interstage seal housing.

10. The system of claim 1, wherein the at least one biasing support is centered within an outer surface of the interstage seal housing.

11. The system of claim 1, wherein the seal positioned on the radially inward surface of the interstage seal housing is formed from a circumferentially extending housing having a plurality of seal arms extending radially inward forming a labyrinth seal on the radially inward surface of the interstage seal housing.

12. The system of claim 11, wherein the plurality of seal arms positioned on the radially inward surface of the interstage seal housing are seal arms that are generally parallel with each other.

13. The system of claim 1, wherein the at least one side wave spring comprises a plurality of side wave springs.

14. The system of claim 13, wherein the plurality of side wave springs contacts the outer surface of the interstage seal housing and the adjacent component of the gas turbine engine multiple times with a W shaped configuration.

15. The system of claim 14, wherein the W shaped configuration of the plurality of side wave springs has a plurality of ridges and valleys coupled together in an alternating pattern along a longitudinal axis.

16. The system of claim 13, wherein the plurality of side wave springs extend circumferentially and are offset circumferentially from each other.

* * * * *